United States Patent [19]
Lennon

[11] Patent Number: 6,144,770
[45] Date of Patent: Nov. 7, 2000

[54] MOTION DETECTION METHOD AND APPARATUS

[75] Inventor: Alison Lennon, North Ryde, Australia

[73] Assignee: Canon Kabushiki Kaisha, Tokyo, Japan

[21] Appl. No.: 09/324,650

[22] Filed: Jun. 3, 1999

Related U.S. Application Data

[63] Continuation of application No. 08/762,254, Dec. 9, 1996, Pat. No. 5,937,097.

[30] Foreign Application Priority Data

Dec. 21, 1995 [AU] Australia ................................ PN7271

[51] Int. Cl.[7] ........................................................ G06K 9/36
[52] U.S. Cl. ........................... 382/236; 382/232; 382/238
[58] Field of Search .................................... 382/236, 238, 382/232

[56] References Cited

U.S. PATENT DOCUMENTS

| | | | |
|---|---|---|---|
| 4,864,394 | 9/1989 | Gillard | 348/699 |
| 4,964,699 | 10/1990 | Inoue | 345/98 |
| 5,057,921 | 10/1991 | Robert et al. | 348/459 |
| 5,067,015 | 11/1991 | Cambridge et al. | 348/398 |
| 5,461,655 | 10/1995 | Vuylsteke et al. | 378/62 |
| 5,477,272 | 12/1995 | Zhang et al. | 348/407 |

OTHER PUBLICATIONS

Stollnitz et al., "Wavelets for Computer Graphics", IEEE Computer Graphics and Applications, May, 1995, pp. 76–84.

*Primary Examiner*—Jose L. Couso
*Assistant Examiner*—Anh Hong Do
*Attorney, Agent, or Firm*—Fitzpatrick, Cella, Harper and Scinto

[57] ABSTRACT

The present invention provides a method and apparatus for detecting motion in an input sequence of images. Each image comprises a number of lines and each line has a number of pixels. Values of a region of pixels of a current image are transformed to determine a set of representation values. The set of representation values are indicative of the region of pixels at a number of resolution levels. The set of representation values of the region of pixels of the current image are compared with a set of representation values of a corresponding region of pixels from a stored previous image. Based on the comparing step, a difference measure is determined between the region of pixels and the corresponding region of pixels that is indicative of the presence or absence of motion in the current image.

10 Claims, 6 Drawing Sheets

MOTION DETECTION METHOD AND APPARATUS

This application is a continuation of application Ser. No. 08/762,254, filed Dec. 9, 1996, now U.S. Pat. No. 5,937,097.

FIELD OF INVENTION

The present invention relates to the display of images on a color display apparatus such as color computer displays and, in particular, the display of color images on a raster color display apparatus.

DESCRIPTION OF THE PRIOR ART

The display of images on devices such as Cathode Ray Tubes (CRT) and twisted nematic-type liquid crystal displays (LCD) is a known art. High resolution color CRT or LCD display devices in common use for the display of images are capable of displaying on the order of 1024 lines by 1280 pixel on each line. Each pixel consists of red, green and blue information representing the intensity level of that pixel on the surface of the CRT or LCD. Additionally, common standards in use assume a refresh rate generally above 25 Hz and commonly 60 Hertz.

The image is formed on the particular display by utilizing the persistence on a fluorescent screen (CRT) or utilizing a transmittance change of a crystal element (LCD). The impression made by the light received by the eye from the screen persists for a small fraction of a second after the source is removed. In presenting many frames to the eye over each second, the eye integrates between each frame. There is created the perception that the images are being displayed in a continuous fashion. To create the perception of motion, enough complete frames must be shown during each second so that the eye will continually integrate between them. This effect can normally be produced by having a picture repetition rate greater than about 16 frames per second.

The rate of 16 frames per second, however, is not rapid enough to allow the brightness of one picture to blend smoothly into the next when the screen is darkened between frames. At this rate the screen will appear to "flicker" if the image written on the screen does not have a long "persistence" between frames. In common CRT-type screens, the persistence normally lasts for only a very short interval and decays very rapidly before the next frame is displayed. In an LCD type display, the element is chosen to have a relatively short response time to simulate the effect of a CRT with a short persistence. Hence these devices often produce flicker if used at a low refresh rate.

It has been found that a picture repetition rate of 30 frames per second is not rapid enough to overcome flicker at the light levels produced by a CRT screen. One method adopted to overcome this problem is interleaving, whereby, different portions of the image are displayed in an interleaved nature. However, this method does not overcome a fundamental problem in that, as the number of pixels to be displayed is increased, the time available for the display of each pixel becomes increasingly limited. For example, in the case of a system with a 1280 (lines)×1024 pixels display and a frame frequency of 30 Hz, the time to display a single pixel, ignoring any horizontal or vertical flyback time, is approximately:

$$\text{pixeltime} = \frac{1}{1280 \text{ lines} \times 1024 \text{ pixels} \times 30 \text{ Hz}}$$

$$= 25.4 \text{ nanoseconds}$$

As this is the maximum time available to change the color value of a particular pixel, the color displayed by each pixel element must be capable of being changed within this short time if the display is to faithfully reproduce an intended-input image which is subject to change over time.

This interval is extremely short. If the resolution of the display device is increased, the period becomes even shorter. For example, an increase of resolution to 1920 lines×2560 pixels results in the time to display each pixel being reduced to about 6.78 nanoseconds. The response time of each pixel of the display device must be able to keep up with this shortened time.

In recent years, Clark and Lagerwall have proposed a ferroelectric liquid crystal device (FLCD) having a high speed responsive characteristic and a memory characteristic. U.S. Pat. No. 4,964,699, which issued on Oct. 23, 1990 to Hiroshi Inoue, proposes a ferroelectric liquid crystal element display device (FLCD). However, it has been found in practice that, for the higher resolution required of modern computer and television displays, the response time of the ferroelectric element is insufficient to enable a high-speed ferro-electric display to display images at standard rates and resolutions such as the NTSC standard rate, or even rates lower than this standard. This disadvantage is further exacerbated when the resolution of the display is increased.

In relation to the memory characteristics of the ferroelectric form of display, it has been found that the pixel elements maintain their state for a substantial period of time after being set to a particular state. Although this period of time can vary in practice, periods of up to several hours have been measured, with displays with persistence levels on the order of minutes being produced. Thus, a further disadvantage arises in that, not only is the response time too slow, but that a pixel element tends to have a value that persists for a long period of time after a change.

In order to utilize a display device having a memory characteristic to display an image with a high refresh rate, it is desirable to detect changes in subsequent frames of an input image sequence in order to define those areas of an individual frame that have changed from the previous frame and should be updated as a matter of high priority, especially where the input image sequence may contain noise which would lead to changes from frame to frame which do not necessarily reflect changes in the true input image.

SUMMARY OF THE INVENTION

In accordance with a first aspect of the present invention, there is provided an apparatus for detecting motion in an input sequence of images, each image comprising a plurality of lines and each line comprising a plurality of pixels, the apparatus comprising: coding means for transforming values of pixels within at least one region of a current image to form a set of representation values at a plurality of different resolution levels; means for comparing the representation values for at least one of the plurality of different resolution levels with corresponding representation values from a stored set of representation values of a previous image of the input sequence; and difference means for determining a difference value from the comparison result received from the comparing means.

In accordance with a second aspect of the present invention, there is provided a method for detecting motion in an input sequence of images, each image comprising a plurality of lines and each line comprising a plurality of pixels, the method comprising the steps of: transforming values of a region of pixels to determine a set of representation values, the set of representation values being indicative of the region of pixels at a plurality of resolution levels; comparing the set of representation values of the region of pixels, of a current image, with a set of representation values of a corresponding region of pixels from a previous image; and determining, based on the comparing step, a difference measure between the region of pixels and the corresponding region of pixels.

In accordance with a third aspect of the present invention, there is provided an apparatus for providing a display signal from an input sequence of images, the apparatus comprising: memory for storing image data; means for generating the display signal; and means for detecting motion in a current image of the input sequence, wherein the detecting means is coupled to the memory and the generating means. The detecting means processes the current image as a plurality of blocks. The detecting means comprises: means for decomposing a block of pixel values of the current image to provide a set of representation coefficients at a plurality of different resolution levels; means for computing a difference for each resolution level between the set of representation coefficients of the current image and corresponding representation coefficients of a previous image stored in the memory; and means for measuring a block difference for the current block dependent on the plurality of differenced, wherein the block difference measure indicates motion in the current block. The generating means generates the display signal using the image data stored in the memory in response to the block difference measure, wherein the display signal contains comprise a block of pixel values dependent upon the current block of pixel values.

In accordance with a fourth aspect of the present invention, there is provided a method for providing a display signal from an input sequence of images, the method comprising the steps of: detecting motion in a current image of the input sequence, wherein the current image is processed as a plurality of blocks, the detecting step further comprising the steps of:

decomposing a block of pixel values of the current image to provide a set of representation coefficients at a plurality of different resolution levels;
  determining a difference for each resolution level between the set of representation coefficients of the current image and corresponding representation coefficients of a previous image stored in a memory; and
  measuring a block difference for the current block dependent on the plurality of differences wherein the block difference measure indicates motion in the current block; and
  generating the display signal using the image data stored in the memory in response to the block difference measure, wherein the display signal comprises a block of pixel values dependent upon the current block of pixel values.

In accordance with a fifth aspect of the invention, there is provided a computer software system having a set of instructions for execution on processing means to detect motion between frames of an input video signal, the set of instructions formed into a plurality of process modules comprising: a transformation process for transforming a block of pixels of a current image frame to form a set of representation values at a plurality of different resolution levels; a comparison process for comparing the set of representation values of the current image frame with a set of representation values of a corresponding block of pixels of a previous image frame; and a difference process for measuring a block difference between the block of the current image frame and the corresponding block of the previous image frame, wherein the block difference indicates motion in the current image frame.

Preferably, the transforming process of the computer software system repeatedly applies a wavelet transformation, wherein the number of repeated applications corresponds to the number of different resolutions levels. Still further, the wavelet transformation is one of the group consisting of Haar and Daubechies transforms.

BRIEF DESCRIPTION OF THE DRAWINGS

Two embodiments of the present invention are described with reference to the accompanying drawings, in which.

DESCRIPTION OF THE PREFERRED EMBODIMENT

The present invention provides a method and apparatus for determining the priority of changing a particular line. This involves providing a plurality of measurements of possible changes, being a measurement at a multitude of resolution levels, of the pixel values of a region of a line. The priority value is produced based on these measurements and previous similar measurements.

Figure 1:
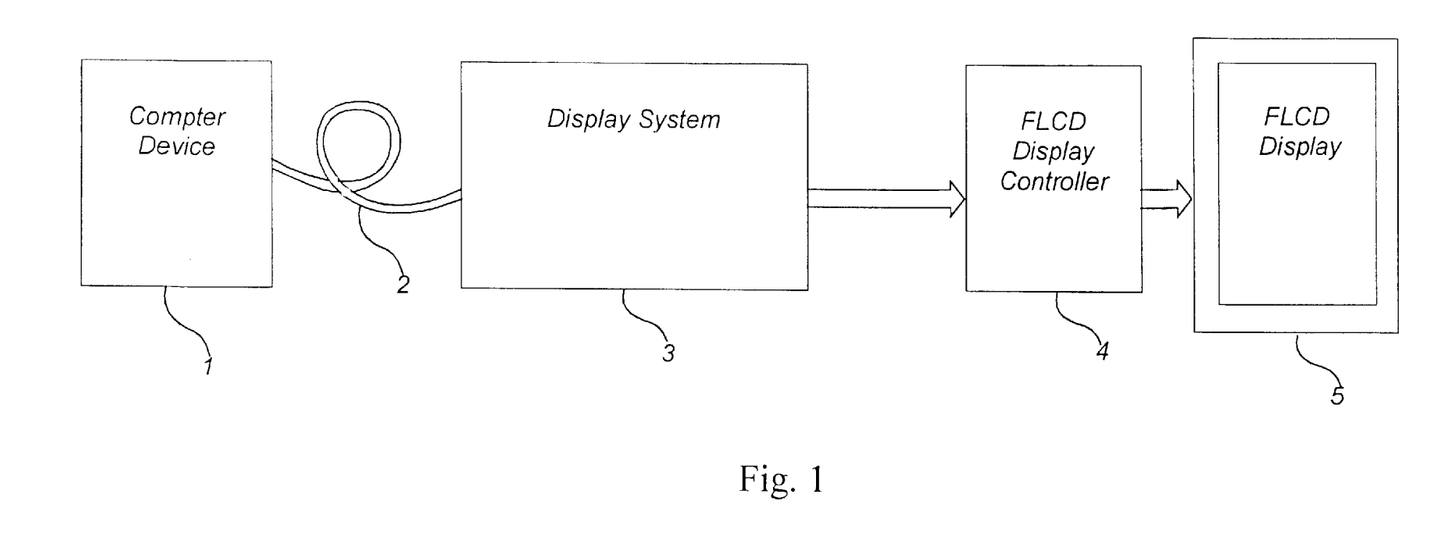
FIG. 1 is a schematic view of an overall display system incorporating the preferred embodiment of the present invention.

Referring now to FIG. 1, a display system 3 is connected between a device 1 and a display controller 4. In turn, the display controller is connected to a display 5. In particular, the display system 3 is shown configured for receiving an image output from a device 1, such as a computer, via a cable 2. The image is provided in the form of separate color channels of red, green and blue image information, as well as synchronization information. The image is displayed on a display device 5, having a lower frame rate than that expected by the device 1, via the display controller 4.

Figure 2:
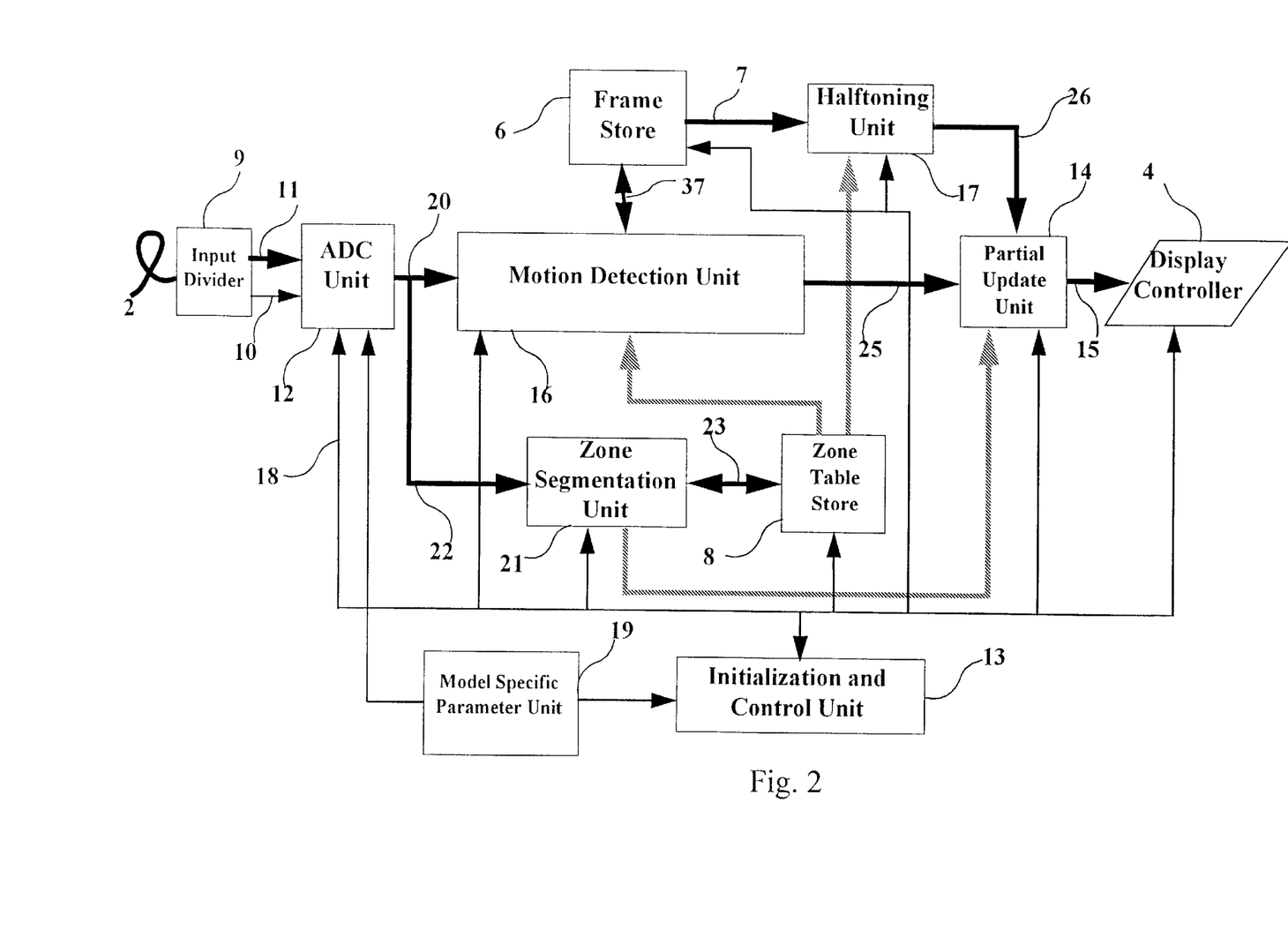
FIG. 2 is a schematic view of the display system of FIG. 1, showing the portions of the display system relevant to the preferred embodiment of the present invention.

Referring to FIG. 2, the display system 3 is illustrated in greater detail. The analogue input is provided to the display system 3 by means of the cable 2. The synchronization information of the analogue input is divided or separated from the color information by an input divider 9. The color information 11 and synchronization information 10 are then forwarded separately to an analogue-to-digital conversion (ADC) unit 12. The red, green and blue analogue input channels 11 from the divider 9 are fed to three analogue-to-digital converters in the analogue-to-digital (A/D) conversion unit 12. Each analogue-to-digital converter converts its analogue channel input information to a corresponding digital value.

The synchronisation or control information 10,11 is also fed to the analogue-to-digital conversion unit 12, and is decoded and digitized to produce system control information such as pixel clock (PCLK), line retrace and frame retrace signals (not shown separately). The control information is output with the pixel color information in addition to being supplied to the remainder of the system 3 via a control channel 18. The control channel 18 couples these signals to various portions of the overall system including an initialization and control unit 13, a zone segmentation unit 21, a halftoning unit 17, zone table store 8, a partial updater (PU) unit 14, a frame store 6, a motion detection unit 16 and the display controller 4. The initialization and control unit 13 is preferably implemented using a microprocessor.

The analogue-to-digital conversion unit 12 requires model specific parameters, crystal timing input information, and input control synchronization information, as well as the three analogue input channels, in order to produce the corresponding binary output pixels for each input pixel at the pixel clock rate which is determined by the model specific parameters. These parameters are stored in a storage device 19 and are loaded into the analogue-to-digital conversion unit 12 at start-up time by the initialization and control unit 13. The model specific parameter unit 19 is preferably a serial EEPROM.

As an alternative to an analogue input, the cable 2 can convey an input signal in a digital format directly to an input buffer (not illustrated but known in the art), that substitutes for the analogue-to-digital conversion unit 12.

In order for a single display system 3 to be connected to a multitude of different computer systems, the cable assembly 2 is preferably fitted with a mode specific crystal and/or the initialization and control unit 13 loads from the storage device 19 model specific parameters into the display system controllers at start-up time. Model specific parameters that tend to vary from system to system include the frequency of the pixel output clock of the computer device 1, the number of pixels per line, the number of lines per frame, horizontal blanking time, vertical blanking time, analogue-to-digital gain and offset parameters, etc. These parameters can then be stored in the cable 2 with different cables being available for different computer devices 1, thereby increasing the versatility and utility of the display system 3.

The number of bits and hence the resolution with which digital values are output from the analogue-to-digital conversion unit 12, varies according to factors such as the cost and speed of the A/D converters used. In this embodiment, each A/D converter of the analogue-to-digital conversion unit 12 outputs eight bits of information for its respective input color on an A/D output bus 20. Hence, the A/D output bus 20 is at least 24 bits wide, representing a single pixel of display information. Additionally, the analogue-to-digital conversion unit 12 outputs pixel clocks, frame and other synchronization information on the A/D output bus 20.

The typical analogue input rate to the display system 3 is 60 Hz, while a screen update rate of the display device 5 is of the order of 15 Hz. Consequently, the pixel display information provided by A/D bus 20 output is fed to the frame buffer or store 6 through the motion detection unit 16. The output 7 of the frame store 6 is coupled to halftoning unit 17, which applies halftoning to the frame. The output 25 of the motion detection unit 16 and the output 26 of the halftoning unit 17 are coupled to the partial updater (PU) 14, which carries out the partial updating of the image frame. The output 15 of the partial updater 14 is coupled to the display controller 14. Substantially that pixel display information of a current frame that has changed from a previous frame is updated on the display device 5. Thus, the screen update rate is reduced.

The zone segmentation unit 21 receives pixel display information 22 from the A/D output bus 20 and is adapted to determine a set of coordinates and a zone type for each of a plurality of regions within a frame of an input image sequence. The set of coordinates and zone type, identify which region of the plurality of regions of the input image comprises a predetermined image format. For example, the zone segmentation unit 21 segments an input image into regions which contain substantially "text characters" or "natural image" (ie, other than "text characters") and determines a set of coordinate positions of these regions relative to the whole input image. The zone type, for example, is represented by at least a one-bit identifier; a zero (0) bit indicates that a region of the image segmented by the zone segmentation unit 21 is a "natural image", and a one (1) bit indicates the region is substantially "text characters". The zone segmentation unit 21 is in communication with the partial updater 14, and can force the update of large regions of motion.

A zone table store 8 is coupled to zone segmentation 21 and is provided to store the set of coordinates and zone type for each of the plurality of regions of the input image. The zone table store 8 is a random access memory (RAM) device which is constantly updated, or written to and read from, by the zone segmentation unit 21 via a bi-directional data bus 23.

The zone table store 8 also provides information to the motion detection unit 16 and the half-toning unit 17, which benefit from an advanced knowledge of the zone type and coordinate position of a region of input image being processed by the respective units (16,17).

Although the zone table store 8, and indirectly the zone segmentation unit 21, provides information to the motion detection unit 16 and half-toning unit 17, they play a subsidiary role in that the motion detection unit 16 and the half-toning unit 17 function satisfactorily without the added benefits these units (8,21).

Figure 3:
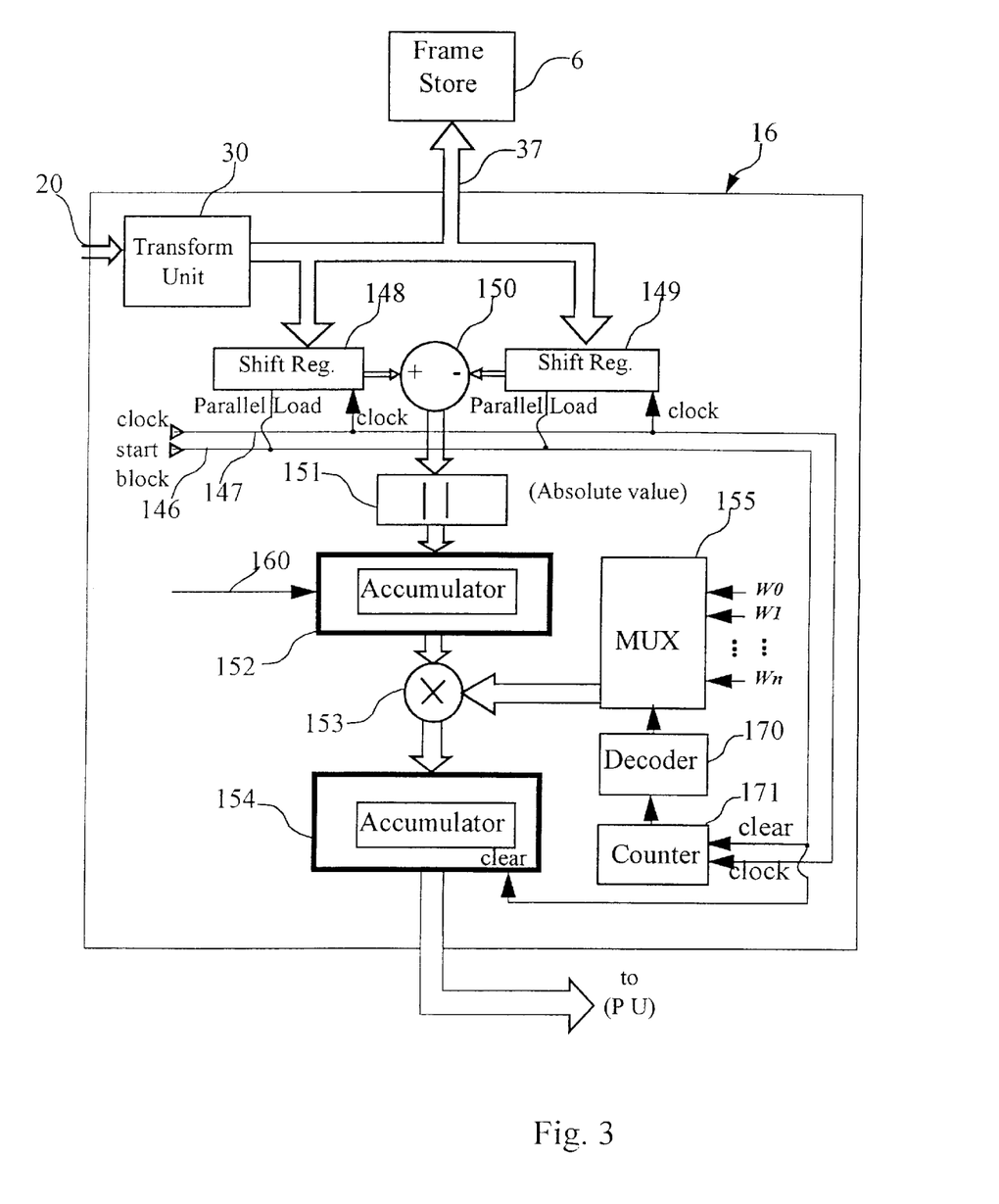
FIG. 3 is a schematic view of the preferred embodiment of the present invention.

Referring now to FIG. 3, the motion detection unit 16 is shown in greater detail. The motion detection unit comprises a transform unit 30, a pair of shift registers 148,149, an adder 150, an absolute value unit 151, accumulators 152 and 154, a multiplexer 155, a multiplier 153, a decoder 170, and a counter 171. The motion detection unit 16 receives input from the A/D output bus 20. In addition to this bus 20, at least two channels capable of carrying a device clock signal 147 and a start block timing signal 146 are provided to the motion detection unit 16.

The incoming pixel information on the A/D output bus 20 is coupled to the transform unit 30. The transform unit 30 is coupled by bus 37 to the frame store 6 and the shift registers 148 and 149. The outputs of shift registers 148 and 149 are coupled to the plus and minus inputs of adder 150, respectively. The output of adder 150 is coupled to absolute value unit 151. The output of the absolute unit value 151 is coupled to accumulator 152. The output of the accumulator 152 and the output of the multiplexer 155 are coupled to the multiplier 153. The output of multiplier 153 is coupled to the second accumulator 154. The output of the accumulator 159 is provided as the output 25 of the motion detection unit 16 to the partial updater 14. The device clock 147 is coupled to the shift registers 148 and 149 and to the clock input of the counter 171. The start block timing signal 146 is coupled to shift registers 148 and 149, the clear input of the counter 171 and the clear input of the second accumulator 154. The output of the counter 171 is coupled to the decoder 170. In turn, the output of the decoder 170 is coupled to the multiplexer 155. In addition, as is described below in detail, predetermined weight values $W_1$ to $W_n$ are provided to the input of the multiplexer 155. A separate clear signal 160 is coupled to the first accumulator 152.

The pixel display information received by the motion detection unit 16, via the A/D output bus 20, is accumulated to form a collection of pixel values for a predetermined number of consecutive pixels, herein referred to as a block of pixels. In the preferred embodiment of the present invention, the block of pixels is a line segment typically eight (8) pixels in length comprising pixel color information belonging to a single frame of an input image sequence.

However, it is envisaged that a memory buffer (incoming line buffer(s)) can be used to store at least a substantial portion of an image frame before processing by the motion detection unit 16. The motion detection unit 16 can benefit by processing a block of pixels in the form of a longer line segment or a two-dimensional array, and thus detecting motion within the portion of the input image.

When the block of pixels is received by the transform unit 30, a wavelet transform is applied to the block to recursively decompose the block into a plurality of lower resolution blocks representing different resolution representations of the current pixel block of a current frame of the input image sequence. The plurality of lower resolution representations grouped to form a single encoded multi-resolution block, as hereinafter described, is subsequently sent via the bus 37 to the frame store 6 and to a first shift register 148. Hence, the first shift register 148 is loaded with the multi-resolution block of a current block of pixels belonging to the current frame of the input image sequence. While at substantially the same time, or a short time later, a second shift register 149 is loaded with a corresponding multi-resolution block from a previous frame of the input image sequence stored in the frame buffer 6 via the bus 37.

To simplify the description of the embodiments of the present invention, the multi-resolution block to be loaded into the first shift register 148 is hereinafter referred to as an "incoming block", and the corresponding multi-resolution block of a previous frame to be loaded into the second shift register 149 is referred to as "reference block".

Figure 4:
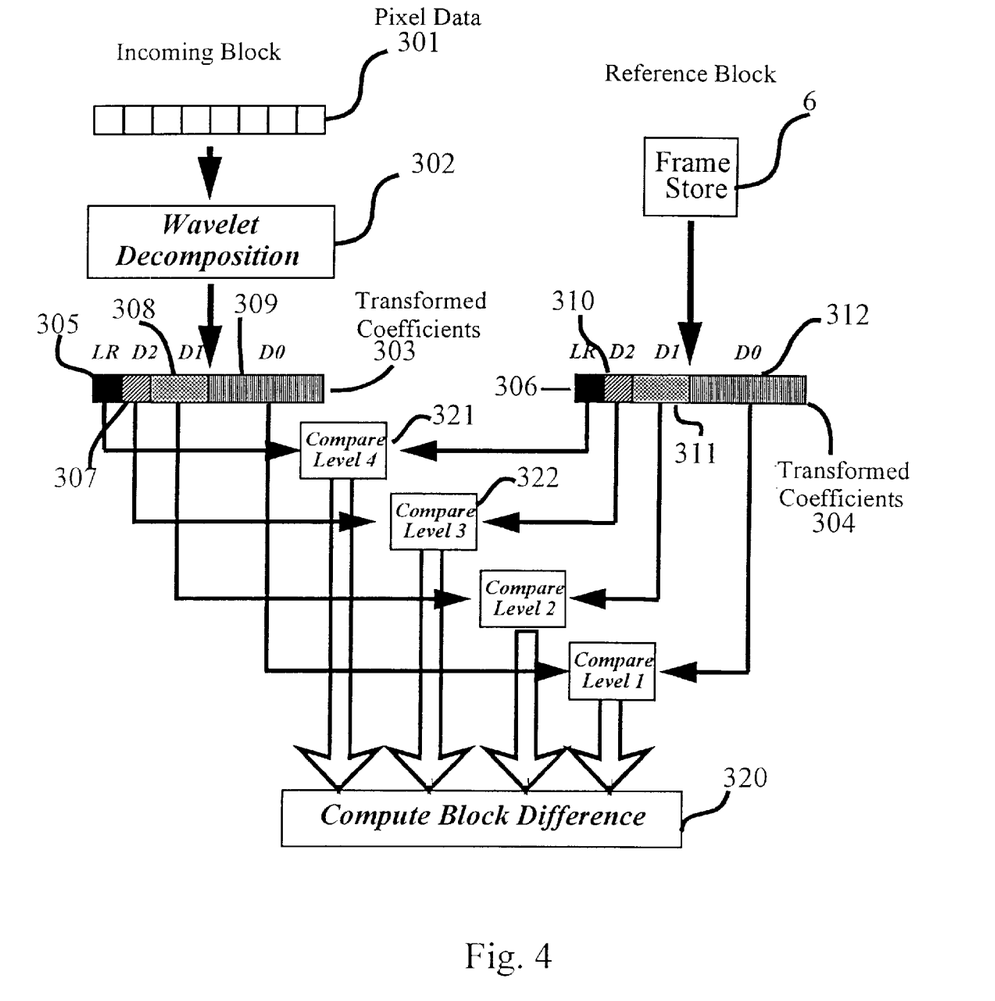
FIG. 4 is a schematic representation of the wavelet decomposition in accordance with the method used by the preferred embodiment.

Turning now to FIG. 4, there is shown a graphical depiction of the method utilized by the motion detection unit 16 of FIG. 3. Pixel data input to the motion detection unit 16 is divided, as mentioned above, into blocks of a predetermined number of pixels. For each block of pixels, a resolution decomposition transform is recursively applied to form a plurality of successive lower resolution representations of each block of pixels. Typically, the resolution decomposing transform is a wavelet transform including such known transforms as the Haar transform or the Daubechies (D4) wavelet transform.

A more detailed survey of wavelet transforms is available from the following publications:

Debauchies, I., "Ten Lectures on Wavelets", Society for Industrial an Applied Mathematics (1992); and Stollnitz, E. J., T. D. DeRose, and D. H. Salesin, "Wavelets for Computer Graphics", IEEE Computer Graphics and Applications, May, 1995.

Figure 5:
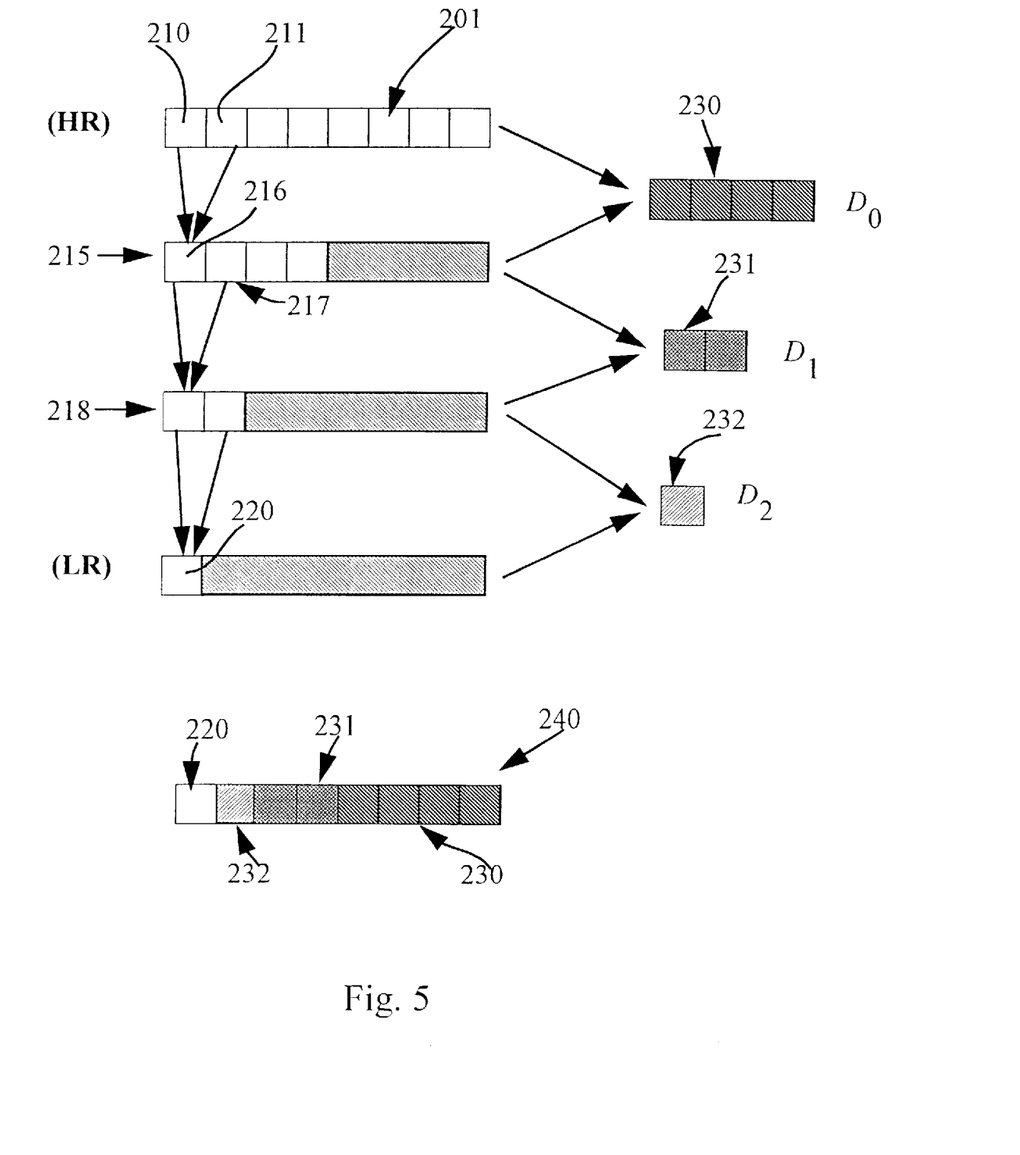
FIG. 5 is a schematic representation of the multi-resolution comparison in accordance with the method used in the preferred embodiment.

A brief description of a typical wavelet transform, the Haar transform, is given with reference to FIG. 5.

A block of pixels 201 having a predetermined number of pixels (e.g. 8 pixels in FIG. 5) is decomposed to form a plurality of lower resolution blocks by the successive decomposition steps of a wavelet transform. The block 201 has highest resolution, whereas the block 219 has lowest resolution. For example, in the first decomposition, pixel values of two adjacent pixels 210, 211 are decomposed to a lower resolution coefficient element 216 of block 215. A resolution difference measure, referred to hereinafter as a set of "detail coefficients", can be conceptualised as a difference between consecutive levels of resolution. The original pixel block 201 is reconstructed from the lowest resolution representation (a single coefficient 220 in the case of the Haar transform) and the detail coefficients of the higher resolution levels 215 and 218. For example, the original high resolution (HR) pixel block 201 is reconstructed from the first lower resolution coefficients 215 and the first detail coefficients ($D_0$) 230 by applying an inverse wavelet transform step, or a "wavelet recomposition" step.

A further decomposition step applied to the first lower resolution coefficients 215 results in a set of second lower resolution coefficients 218 and a corresponding set of second detail coefficients ($D_1$) 231. The above described process is applied recursively to a block of pixels a predetermined number of times or until a lowest resolution (LR) representation 220 is obtained.

Generally, with each application of the wavelet transform, the resolution of the block of pixels decreases while the scale of the block increases as known to those skilled in the art. The block of pixels 201 is therefore encoded, or represented, by a single encoded multi-resolution block 240 comprising: a lowest resolution (LR) coefficient 220, an associated detail coefficient ($D_2$) 232, the corresponding second detail coefficients ($D_1$) 231 and the first detail coefficients ($D_0$) 230.

In the preferred embodiment of the present invention and as is evident from FIG. 2 or FIG. 3, the frame buffer 6 (also known as a frame store) is in direct communication with the motion detection unit 16 via the bus 37. Hence, a preferment of this embodiment is that image data is stored in the frame buffer 6 in an encoded or multi-resolution representation in the manner described with reference to FIG. 5 and on a block by block basis. Preferably, encoded image data in the frame buffer 6 could be compressed by, for example, quantization and entropy coding of the transformed coefficients. Compression results in reduced memory requirements for the frame buffer 6.

At the request of the partial update unit 14, the halftoning unit 17 extracts the image data from the frame buffer 6, reconstructs an image region by a recomposition or inverse wavelet transform, and then halftones the image region. The halftoned region is transmitted to the display 5 via the display controller 4 at the refresh rate of the display 5.

Referring to FIG. 4, a block of pixels 301 is shown from a current frame of an image sequence which is subjected to a wavelet transformation 302 to form a multi-resolution block of transformed coefficients, referred to hereinbefore as the "incoming block" 303, and the reference block 304 is a corresponding multi-resolution block of a previous frame, of the image sequence, retrieved from the frame buffer 6.

In the preferred embodiment, the incoming block 303 and the reference block 304 are compared at each resolution level to compute a block difference measure 320.

In the example of FIG. 4, the lowest resolution (LR) coefficient 305 of the incoming block 303 is compared (level 4) 321 with the lowest resolution (LR) coefficient 306 of the reference block 304. The result of the comparison is utilized in the computation of a block difference measure for the lowest resolution 220.

Next, the associated detail coefficients 307, 310 of the incoming block 303 and the reference block 304 are compared. This is a comparison 322 of one resolution higher (level 3) than the lower resolution of the multi-resolution block. This comparison is repeated until substantially all detail coefficients 307 to 309 of the incoming block 303, and the detail coefficients 310 to 312 of the reference block 304 have been compared respectively. The results of these comparisons are also utilized in the determination of the block difference measure 320.

Referring to FIG. 3, the device clock and start block timing signals from their respective channels 146, 147, synchronize a parallel forwarding of the incoming block and the reference block from the first and second shift registers 148,149, respectively into the adder 150. The blocks are processed according to the following steps:

(a) The adder 150 determines a difference measure between corresponding coefficients of the incoming block and the reference block in registers 148 and 149;

(b) The result of the adder 150 is forwarded to the absolute value unit 151, which determines an absolute value of the difference measure, to form an absolute difference measure, and preferably the absolute difference is then thresholded to remove small values possibly due to noise;

(c) the absolute difference measure is input to the first summation unit implemented by accumulator 152, (d) steps (a) to (c) are repeated for all coefficients for one resolution level of the multi-resolution incoming block, or reference block, to create a level difference measure for one resolution level. A variation of the preferred embodiment is to use the squared absolute difference in step (b).

At the completion of steps (a) to (d) for each resolution level, the level difference measure is forwarded to the multiplier 153 and the first summation unit 152 is cleared by the clear signal input 160 to the first summation unit 152. The multiplier 153 also receives input from a multiplexer 155 which selects a weight value from a plurality of predetermined weight values $W_1$ and $W_n$, and multiplies the weight value with the level difference measure.

The multiplexer 155 is aided by a decoder 170 and a counter 171 in the selection of the weight value. Typically, the weight value can take on any predetermined value. The decoder 170 activates the multiplexer 155 to provide a weight value $W_1$ to $W_n$ in response to the output of counter 171.

The multiplier 153 forwards to the second summation unit implemented by accumulator 154 the resultant product of the weight value and the level difference measure. The second summation unit 154 adds over all resolution levels the product of the weight value and the level difference measure to form a block difference measure. The block difference measure is then dispatched on the bus 25 to the partial update unit 14, which determines which lines of pixels of a current frame are to be updated. The process described with reference to FIG. 3 is repeated for each block of pixels in a current frame of an image sequence.

The determination of the block difference measure 320 can be summarized by the following equations:

$$L_n = \sum_{i=1}^{l_n} \|r_{n,i} - t_{n,i}\|, \quad (1)$$

and $$B = \sum_{n=1}^{N} W_n L_n, \quad (2)$$

where $r_{n,i}$ and $t_{n,i}$ are the "ith" coefficient value at the "nth" resolution level of the multi-resolution block referred to hereinbefore as the reference block and the incoming block, respectively, and ln is the number of coefficients representing resolution level, n.

The "$L_n$" value in Equation (1), or Equation (2), is a level difference measure, determined at the "nth" resolution level, between the reference and incoming blocks. The level difference measure "$L_n$" is multiplied by a predetermined weight value "$W_n$". The resulting product is summed over all resolution levels (in this example, a maximum of "N" resolution levels) to result in the block difference measure 320 also denoted in Equation (2) as "B".

The block difference calculation of the preferred embodiment is based on a comparison of a wavelet transform of pixel color values which constitute a block of pixels and the corresponding information of the block of pixels in a previous frame of an image sequence. In a slight variation of this embodiment luminance and chrominance values of the pixels can be used instead of the pixel color values.

Figure 6:
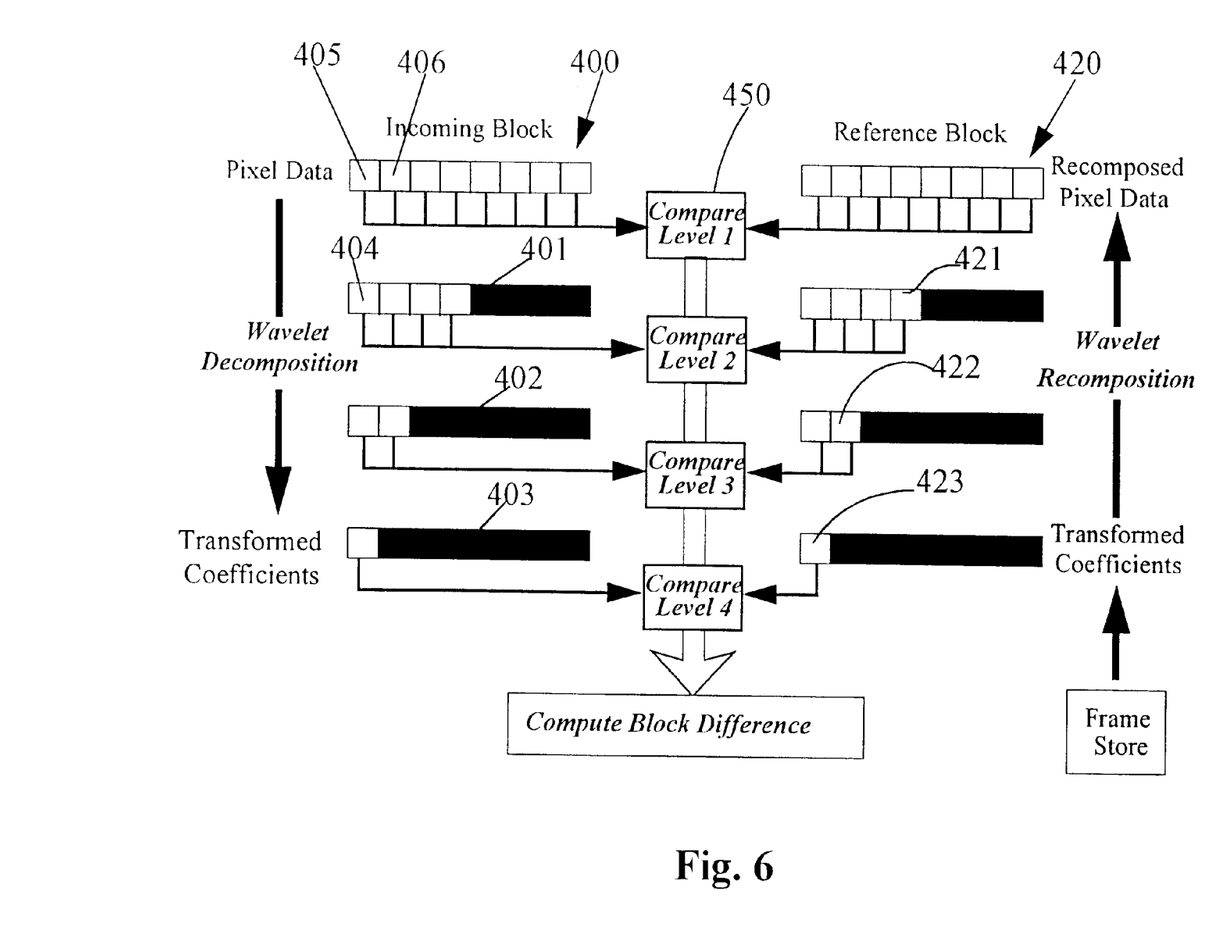
FIG. 6 is a schematic representation of the method of multi-resolution comparison in accordance with an alternate embodiment.

Referring now to FIG. 6, there is illustrated an alternative embodiment of the present invention. This embodiment is a variation on the preferred embodiment as hereinbefore described with reference to FIG. 4.

An incoming block of pixels 400 is decomposed to form a plurality of lower resolution blocks 401 to 403 by successive decomposition steps (of a wavelet transform), while a reference pixel block 420 is recomposed, in a step-wise manner, from a corresponding multi-resolution block retrieved from the frame buffer 6 by an inverse wavelet transform. The recomposition of the reference pixel block 420 also generates a plurality of corresponding lower resolution blocks 421 to 423. The incoming block of pixels 400 is compared with the reference pixel block 420. The plurality of lower resolution blocks 401 to 403 are respectively compared with the plurality of corresponding lower resolution blocks 421 to 423. The result of the comparison is utilised in a computation of the block difference.

The foregoing describes a system of detecting motion, especially in the presence of noise, through obtaining a plurality of resolution measures of a region of image and comparing corresponding resolution measures over time. The foregoing only describes two embodiments of the present invention and modifications, obvious to those skilled in the art, can be made thereto without parting from the scope of the invention. For example, the motion detection process can be implemented as computer software comprising a set of instructions to be carried out using a processing unit, which may be implemented using a general purpose microprocessor, a customised signal processor, or the like. The set of instructions may be stored on a recording medium, a non-volatile memory, or the like, for retrieval into memory internally or externally coupled to the processing unit, where the processing unit executes the set of instructions to carry out the process modules.

What is claimed is:

1. An apparatus for detecting motion in an input sequence of images, each image comprising a plurality of pixels, said apparatus comprising:

transforming means for transforming values of pixels to representation values at a plurality of different resolution levels;

comparing means for comparing and iteratively determining a difference measure between said representation values for at least two of said plurality of different resolution levels, of a current image, and corresponding representation values from a previous image; and detection means for detecting motion in said current image in accordance with said difference measure determined by said comparing means.

2. An apparatus according to claim 1, wherein said transforming means comprises means for wavelet transforming said values of said pixels to form said set of representation values.

3. An apparatus according to claim 2, wherein said wavelet transforming means is adapted to implement one of the group consisting of Haar and Daubechies transforms.

4. An apparatus according to claim 1, wherein said values of pixels are color values of the pixels.

5. An apparatus according to claim 1, wherein said values of pixels are luminance and chrominance values of pixels.

6. An apparatus according to claim 1, further comprising providing means for providing an image signal from said input sequence of images in accordance with the result of said detecting means.

7. An apparatus according to claim 1, wherein said current image is processed as a plurality of blocks.

8. An apparatus according to claim 6, further comprising display means for displaying the image signal provided by said providing means.

9. An apparatus according to claim 8, wherein said display means is a liquid crystal display.

10. A method for detecting motion in an input sequence of images, each image comprising a plurality of pixels, said method comprising the steps of:

transforming values of pixels to representation values at a plurality of different resolution levels;

comparing and iteratively determining a difference measure between said representation values for at least two of said plurality of different resolution levels, of a current image, and corresponding representation values from a previous image; and detecting motion in said current image in accordance with said difference measure determined at said comparing step.

* * * * *

UNITED STATES PATENT AND TRADEMARK OFFICE
CERTIFICATE OF CORRECTION

PATENT NO. : 6,144,770

DATED : November 7, 2000

INVENTOR(S): ALISON LENNON

Page 1 of 2

It is certified that error appears in the above-identified patent and that said Letters Patent is hereby corrected as shown below:

SHEET 1

Fig. 1, "Compter" should read --Computer--.

COLUMN 2

Line 10, "intended-" should read --intended--.

COLUMN 3

Line 36, "comprise" should be deleted.

COLUMN 6

Line 45, "an" should read --and--.

COLUMN 8

Line 25, "above described" should read --above-described--.

UNITED STATES PATENT AND TRADEMARK OFFICE
CERTIFICATE OF CORRECTION

PATENT NO. : 6,144,770

DATED : November 7, 2000

INVENTOR(S): ALISON LENNON

Page 2 of 2

It is certified that error appears in the above-identified patent and that said Letters Patent is hereby corrected as shown below:

<u>COLUMN 9</u>

```
Line 57, "over all" should read --overall--.
```

Signed and Sealed this

Twenty-ninth Day of May, 2001

*Attest:*

NICHOLAS P. GODICI

*Attesting Officer*   Acting Director of the United States Patent and Trademark Office